United States Patent
West, Jr.

(10) Patent No.: US 6,462,851 B1
(45) Date of Patent: Oct. 8, 2002

(54) NETWORK AND METHOD FOR TRANSMITTING REVERSE ANALOG SIGNALS BY SUB-SAMPLING THE DIGITAL REVERSE BANDWIDTH

(75) Inventor: Lamar E. West, Jr., Maysville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 19 days.

(21) Appl. No.: 09/840,765

(22) Filed: Apr. 23, 2001

(51) Int. Cl.[7] ............................................. H04B 10/12
(52) U.S. Cl. .................. 359/173; 359/135; 359/137; 359/189; 359/158; 725/129; 375/259; 375/316; 375/355
(58) Field of Search ................................ 359/125, 137, 359/135, 158, 173, 189, 180, 110, 118, 154; 725/129; 375/259, 316, 355

(56) References Cited

U.S. PATENT DOCUMENTS

| | | | |
|---|---|---|---|
| 6,005,477 A | * 12/1999 | Deck et al. | 340/310.02 |
| 6,271,951 B1 | * 8/2001 | Proctor | 359/137 |
| 6,356,369 B1 | * 3/2002 | Farhan | 359/125 |
| 6,373,611 B1 | * 4/2002 | Farhan et al. | 359/180 |
| 6,411,408 B1 | * 6/2002 | Dennis et al. | 359/124 |

OTHER PUBLICATIONS

U.S. Ser. No. 09/102,334 filed Jun. 22, 1998, by Forrest M. Farhan and Alberto P. Giabazzi entitled "Digital Optical Transmitter".

* cited by examiner

*Primary Examiner*—Leslie Pascal
*Assistant Examiner*—Hanh Phan
(74) *Attorney, Agent, or Firm*—Hubert J. Barnhardt, III; Kenneth M. Massaroni; Shelley L. Couturier (57) ABSTRACT

The present invention describes a method for transmitting reverse analog signals within a specific portion of a reverse band in an HFC communications system. Subscriber equipment (305) receives input defining the specific portion of the band for transmitting reverse analog signals. An optical transmitter (315) then converts the received reverse signals to digital reverse signals and transmits the digital reverse signals at a specified clock rate. Due to shifting of the digital reverse signals within the reverse bandwidth, shifting of the received digital signals reflect the specific bandwidth within which the reverse signals were originally transmitted. An optical receiver (320) then receives the shifted digital reverse signals and converts them back to the original reverse analog signals, whereby transmitting reverse analog signals that are confined to a specific bandwidth and subsampling the specific bandwidth within the reverse bandwidth allows for a substantial decrease in bit rate throughout the HFC communications system allowing a transition network between an HFC network and a digital network.

14 Claims, 10 Drawing Sheets

NETWORK AND METHOD FOR TRANSMITTING REVERSE ANALOG SIGNALS BY SUB-SAMPLING THE DIGITAL REVERSE BANDWIDTH

FIELD OF THE INVENTION

This invention relates generally to broadband communications systems, such as a hybrid/fiber coaxial (HFC) cable television system, and more specifically to a communications network allowing a method for transmitting reverse optical signals in the broadband communications system by sub-sampling a limited bandwidth within the reverse bandwidth.

BACKGROUND OF THE INVENTION

Figure 1:
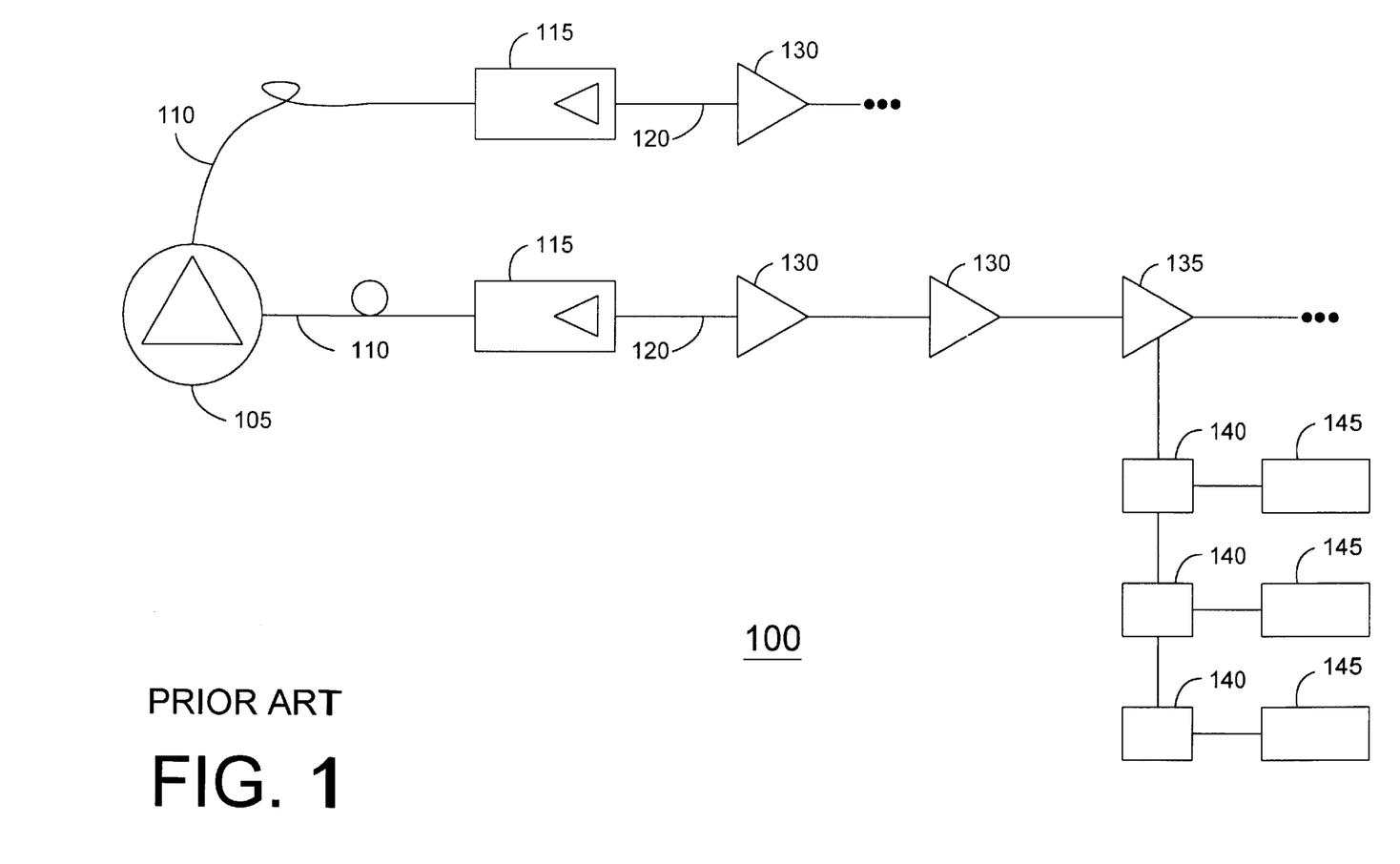
FIG. 1 is a block diagram of a conventional broadband communications system that carries analog optical and electrical signals.

A conventional broadband communications system 100, such as a two-way hybrid/fiber coaxial (HFC) communications system, that carries analog and optical signals is depicted in FIG. 1. The communications system 100 includes headend equipment 105 for generating forward signals that are transmitted in the forward, or downstream, direction along a first communication medium, such as a fiber optic cable 110. Coupled to the headend 105 are optical nodes 115 that convert the optical signals to radio frequency (RF) signals. The RF signals are further transmitted along a second communication medium, such as coaxial cable 120, and are amplified, as necessary, by one or more express amplifiers 130 positioned along the communication medium. Tap amplifiers 135 are typically positioned along the end of the express lines to tap off the RF signals, for example, in three different directions. Taps 140 then further split off portions of the forward signals for provision to subscriber equipment 145, such as set-top terminals, computers, modems, and televisions. It will be appreciated that there are typically several different fiber links connecting the headend 105 with several additional nodes 115, amplifiers 130, 135, and subscriber equipment 145.

In a two-way system, the subscriber equipment 145 can also generate reverse electrical signals that are transmitted in the reverse, or upstream, direction to the headend equipment 105. Any one or more of the distribution amplifiers 130, 135 may amplify such reverse signals. The signals are then converted to optical signals by the optical node 115 before being provided to the headend equipment 105.

Figure 2:
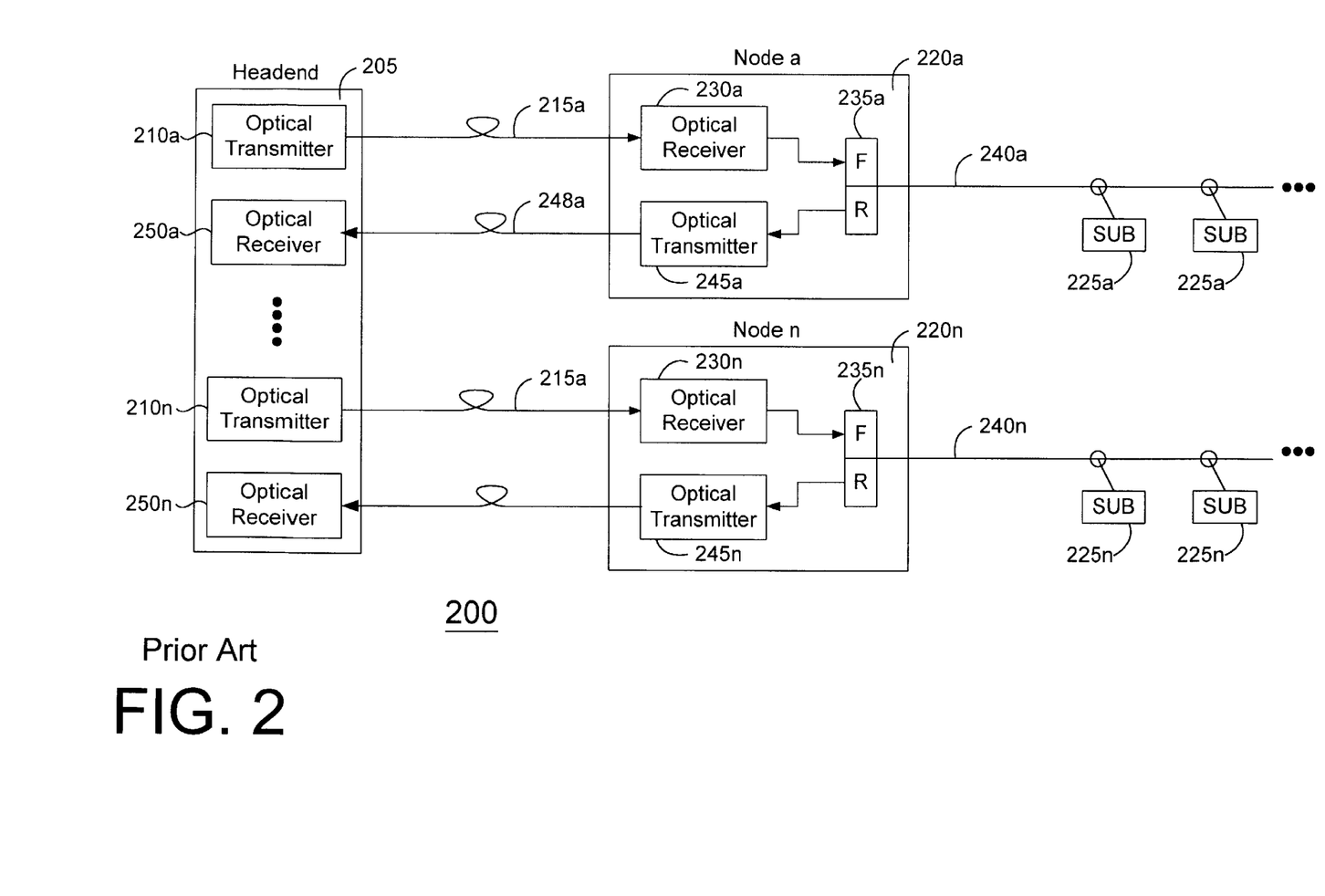
FIG. 2 is a block diagram of an example of an optical link network that includes a headend and optical nodes in further detail that is suitable for use in the broadband communications system of FIG. 1.

Conventionally, an analog communications system transmits and receives the forward and reverse signals in the analog domain. FIG. 2 is a block diagram of an example of an optical link network that includes a headend and optical nodes in further detail. This example is suitable for use in the analog broadband communications system 200. A headend 205 generates and transmits optical signals via optical transmitters 210a–n downstream through their respective fiber links 215a–n. It will be appreciated that there are a plurality of optical transmitters 210a–n transmitting optical signals to a plurality of nodes 220a–n, where, depending upon the network design, each node 220 typically services a different portion of the system. Within the nodes 220a–n, an optical receiver 230a–n, among other operations, converts the optical signals to electrical signals. A diplex filter 235a–n then isolates the forward electrical signals from the reverse path and provides the electrical signals to coaxial cable 240a–n for delivery to the subscriber equipment 225a–n.

In the reverse path, electrical signals emanating from subscriber equipment 225a–n are transmitted upstream via the coaxial cable 240a–n to the node 220a–n. The diplex filter 235a–n isolates the reverse signals from the forward path and provides the signals to an optical transmitter 245a–n for conversion of the electrical signals to optical signals. The optical signals are then transmitted upstream, via an optical fiber 248a–n, to an optical receiver 250a–n that may be located within the headend 205, where the information is processed.

If additional subscriber homes are added to the network 200, it may be necessary to add an additional node 220 that includes separate links for the forward and reverse path to address the additional subscriber equipment within the homes. Additionally, if the operator chooses to optimize the network 200 to accommodate an increase in the amount of reverse signals being transmitted by one optical transmitter, an operator can accomplish this by decreasing the number of subscriber homes that a node 220 services. For example, an operator can reduce an existing network that includes 2000 subscriber homes per node to 500 subscriber homes per node, and add three additional nodes to the network. It can easily be understood that increasing the size or optimizing the network requires a significant amount of equipment and fiber.

It will be appreciated that separate reverse fiber paths, or links 248a–n, are required for each node because reverse optical signals cannot be combined like reverse electrical signals. More specifically, those skilled in the art will appreciate that when the light from multiple optical transmitter outputs, where each output has a specific wavelength, is applied simultaneously to an optical receiver, intermodulation distortion results. If the differences between these received wavelengths are sufficiently small, the intermodulation distortion produced in the optical receiver will obscure the desired electrical signals, which are, for example, signals within the range from 5 MHz to 42 MHz, at the output of the optical receiver. The drift in wavelength encountered in conventional optical transmitters makes this condition likely to happen.

Figure 3:
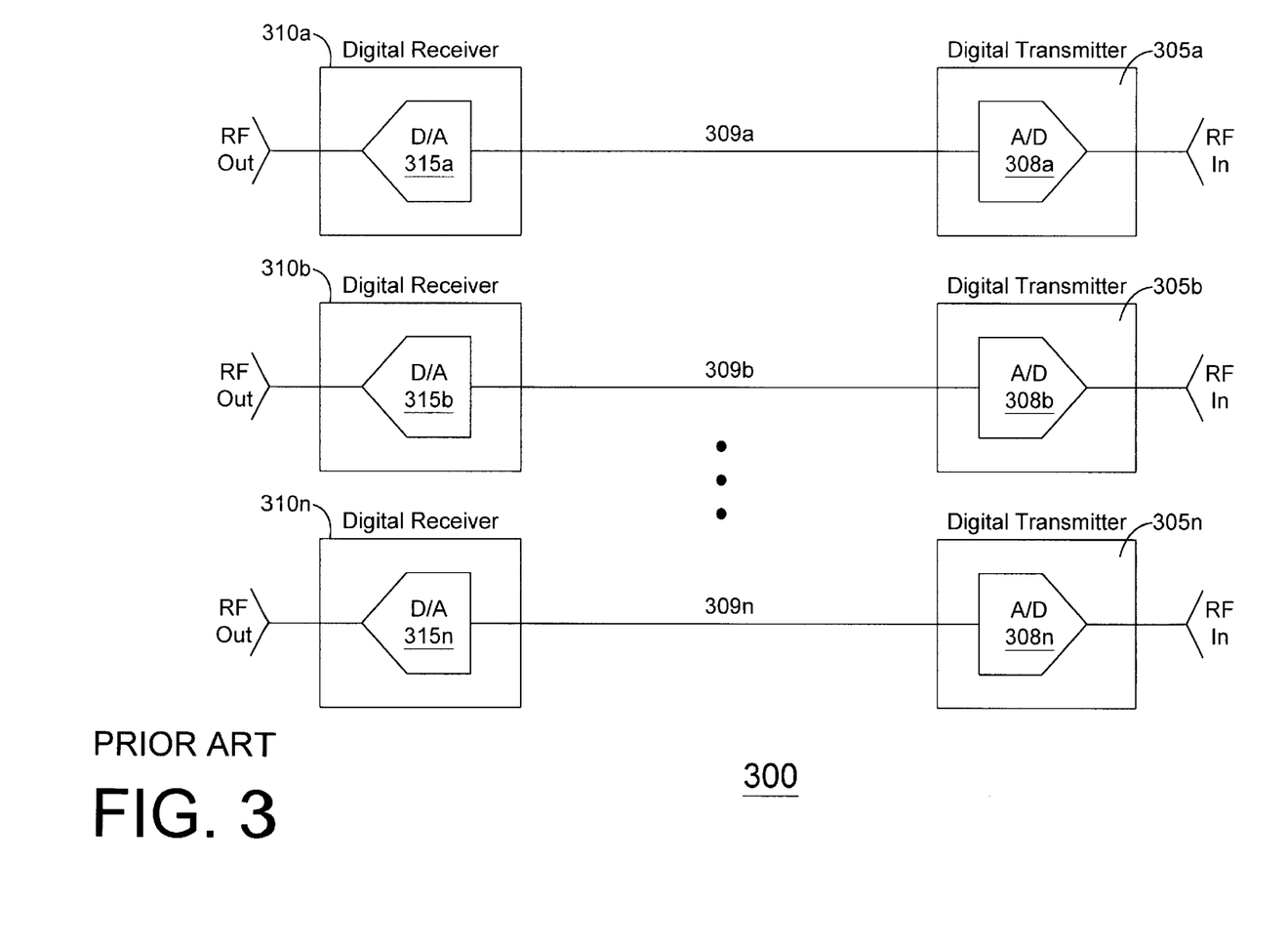
FIG. 3 is a block diagram of a simplified digital reverse communications path that is suitable for use in the broadband communications system of FIG. 1 to digitize analog signals.

Recently, new broadband applications, such as interactive multimedia, Internet access, and telephony, are increasing the number of reverse signals within the reverse bandwidth. As a result, network operators are redesigning networks to effectively increase the total reverse signal carrying capacity, for example, by digitizing the reverse analog signals and, therefore, allowing more digital signals to be transmitted within the existing reverse bandwidth. More specifically, a simplified digital reverse communications path that can be used in a broadband communications system to digitize analog signals is depicted in FIG. 3. Digitizing the optical signals as shown in FIG. 3 allows the operator to increase the reverse signal carrying capacity that is demanded by the growing number of customers and broadband applications.

Briefly, a plurality of digital transmitters 305a–n, each including an analog-to-digital (A/D) converter 308a–n, receives analog electrical signals from a number of pieces of connected subscriber equipment and converts the analog electrical signals to digital optical signals. Linked, via fiber optic cable 309a–n, to each digital transmitter 305a–n is a digital receiver 310a–n that includes a digital-to-analog (D/A) converter 315a–n and which is located further upstream in the network 300. The D/A converter 315a–n converts the received digitized optical signals back to analog electrical signals for delivery to the headend and further processing. An example of a similar digital reverse path is discussed further in commonly assigned, copending patent application Ser. No. 09/102,344, filed Jun. 22, 1998, in the name of "Digital Optical Transmitter", the disclosure of which is incorporated herein by reference.

Figure 4:
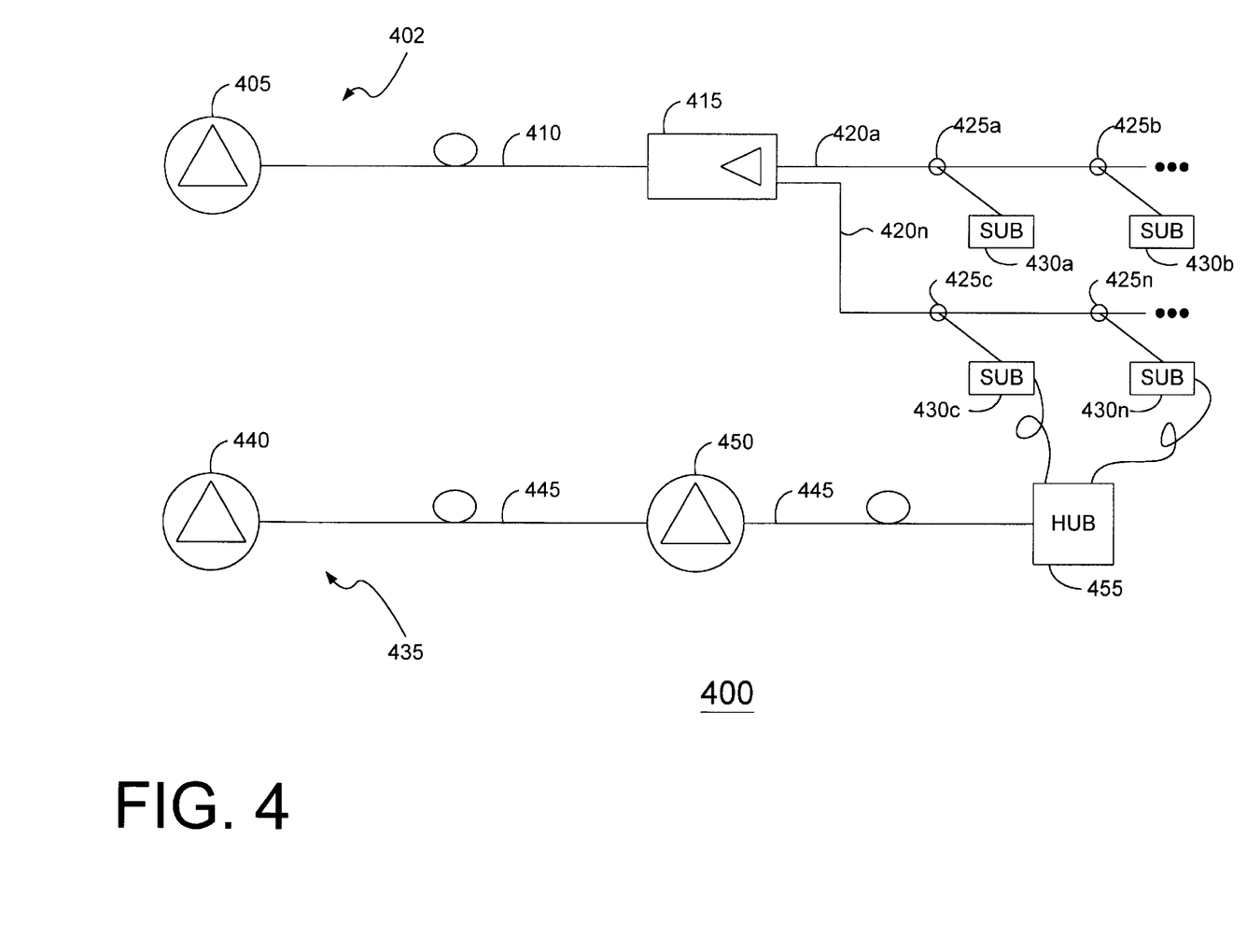
FIG. 4 is a block diagram of an example illustrating a combination network including an HFC analog network and an overlayed digital network for increasing the signal carrying capacity for broadband applications.

To address the new broadband applications and interactive services, system operators are focusing on efforts to drive fiber deeper into neighborhoods and directly into subscribers' homes. The operators need a cost-effective way to add more signals within the existing bandwidth and make two-way capable networks truly two-way active. FIG. 4 is a block diagram of one example illustrating a combination network including an HFC analog network and an overlayed digital network for increasing the signal carrying capacity for broadband applications. In this example, the network 400 has a portion of the system 402 that carries the traditional forward and reverse signals, which can be analog and/or digital signals, using, for example, existing communications equipment, such as analog and digital headend equipment 405 to generate and process analog signals. These analog signals, such as cable television signals, cable modem signals, and e-mail signals can be digitized and routed through an optical fiber link 410 to an optical node 415. The optical node 415 converts the optical signals back to electrical signals. The node 415 then transmits the signals through coaxial cable 420a–n in, for example, several directions. Splitters 425a–n, such as amplifiers or taps, then split the signals further for delivery to subscriber equipment 430a–n via coaxial cable.

A second portion of the network 435 may be overlayed with the first portion of the network 402 to deploy digital interactive services, such as, telephony, Ethernet, and other high-speed data services. Digital headend equipment 440 generates and processes these signals with separate digital equipment that includes, for example, high-speed switches and routers. These digital signals are transmitted through a network of fiber optic cable 445 and secondary hubs 450 to transport the digital signals long distances. A hub 455, which can be, for example, a hub that includes a router, routes the digital signals to the intended subscriber equipment 430a–n, typically via fiber optic cable. Reverse signals from the network 400 are transmitted upstream, via either the coaxial cable or the fiber optic cable, through the different networks 402, 435 back to the respective headend equipment 405, 440 for processing. This network 400 is a network that enables operators to use existing equipment they may already have deployed in the HFC network, such as set-tops, amplifiers, nodes, and taps, in addition to adding a digital network that increases their ability to process broadband applications. Additionally, they may be able to offer services that they were not able to provide with just the existing HFC analog network 402.

Digitizing the reverse path as shown in FIG. 3 and deploying advanced technology and systems as shown in FIG. 4 to offer expanded services, such as high-speed data and two-way interactive applications, can be expensive, however. Most network operators are not ready to invest in the required capital costs to change their existing networks to digital networks. Additionally, an HFC analog network 402 is still required to transmit the analog cable television channels; for example, a subscriber's local channels are typically in an analog format. Typically, network operators that have been operating for a substantial length of time do not have the digital equipment, such as routers, switches, digital transmitters, and digital receivers, required to digitize or route the reverse signals. In order to accomplish this, the operators would have to substantially upgrade their system to include the digital equipment and may also have to lay extensive routes of fiber. Again, the majority of operators have historically transmitted and received analog signals over an analog HFC system; therefore, due to the expensive undertaking of sending digital reverse signals, most operators would like an intermediate step to enable an efficient, low-cost delivery of reverse signals over their existing HFC system.

Thus, in summary, what is needed is a network allowing a method of transmitting the traditional analog reverse signals throughout an existing HFC network that also simplifies the transition from the HFC network to a digital network. This network should not substantially increase the costs of required equipment giving the operators time to transition between the different networks.

DETAILED DESCRIPTION OF A PREFERRED EMBODIMENT

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as limited to the embodiment set forth herein; rather, the embodiment is provided so that this disclosure will be thorough and complete, and will fully convey the scope of the invention to those skilled in the art. For example, the embodiment set forth herein refers to a reverse communications path that is suitable for use in a broadband communications system. The present invention is described more fully hereinbelow.

Figure 5:
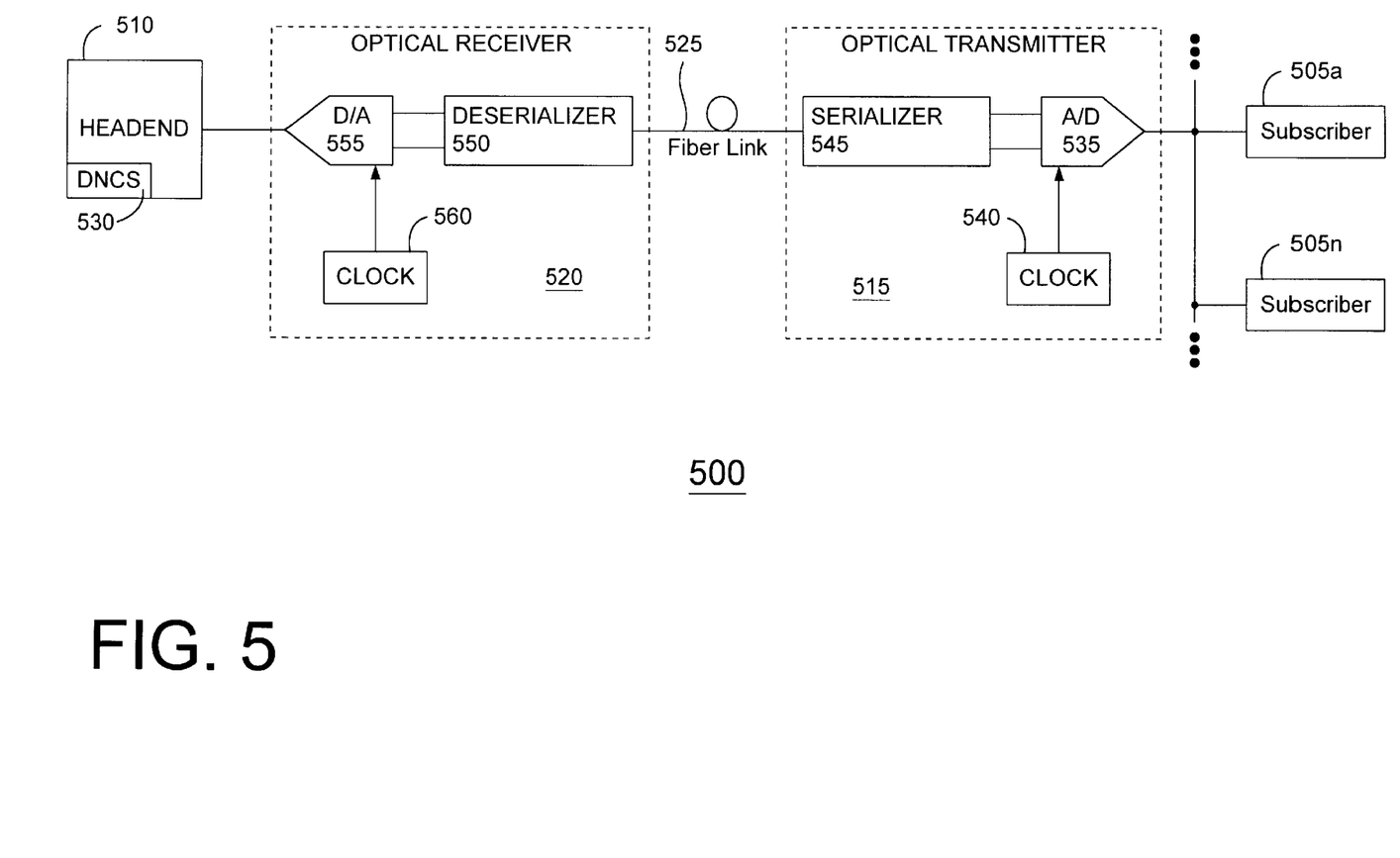
FIG. 5 is a block diagram of a portion of a reverse communications path that is capable of sub-sampling the reverse analog signals that are transmitted within a limited bandwidth in accordance with the present invention.

FIG. 5 represents a portion of a reverse communications path 500 that is capable of sub-sampling the reverse analog signals that are transmitted within a limited bandwidth from subscriber equipment 505a–n. It will be appreciated that in addition to, or overlaying with, the reverse communications path 500 is a digital network (not shown). The reverse communications path 500 and the digital network (not shown) is similar to the combination network that is illustrated in FIG. 4. The digital network (not shown) services all the digital forward and reverse signals, such as telephony and Ethernet signals, and, additionally, may also include some of the traditional reverse analog signals, such as cable modem signals or e-mail signals, that may be converted to digital signals. The traditional reverse analog signals that are not transitioned to the digital network and are left on the analog reverse communications path 500 are then confined to a limited bandwidth within the reverse bandwidth.

It will be appreciated that the reverse communications path 500 is just limited to a small number of reverse analog signals while all other digital, or allocated analog signals that may be converted to digital, are being transmitted over the digital network (not shown). In this manner, the resulting transition reverse path 500 is a very effective method of transmitting both analog and digital signals over an existing HFC broadband communications system along with a later deployed digital network. More specifically, by transmitting fewer analog signals over the HFC broadband communications network, thereby lowering the network's data rates, operators can still utilize the equipment that is currently installed in the HFC broadband communications network while migrating towards a digital network without incurring all the initial capital costs required to deploy such a digital network.

The reverse communications path 500 includes several additional and separate return links that each connects a plurality of subscriber homes, optical transmitters, and optical receivers with a headend although these additional links are not shown for simplicity. Referring to one reverse communications path 500 in the HFC broadband communications system, an optical transmitter 515 receives reverse analog signals from the connected subscriber equipment 505a–n, and then digitizes and frames the reverse signal into a digital word with an analog-to-digital converter 535. More specifically, the reverse signals are framed into words that include a header and other information along with the 10 or 12-bit word, for example. The parallel output of the A/D converter 535 is then serialized by a serializer 545 and further transmitted upstream through fiber link 525. The serialized digital signals are then provided to an optical receiver 520. A deserializer 550 then deserializes the reverse signals and groups them back into digital words. A parallel output of the deserializer 550 then provides the digital signals to a digital-to-analog converter 555 that converts the optical digital signals back to analog signals. The signals are then provided to a headend 510 for further processing.

The headend 510 may include a digital network control system (DNCS) 530 that helps control the flow of the signals through the forward and reverse path in order to avoid a collision of signals. The DNCS 530 is in constant communications with all the subscriber equipment 505a–n (e.g., a set-top terminal) throughout the broadband communications system. In this manner, the DNCS 530 allows only one set-top to transmit the reverse analog signals to a connected optical transmitter 515 during a time slot and, additionally, the DNCS 530 specifies the frequencies within the reverse bandwidth at which the set-tops transmit all reverse signals. In accordance with the present invention, the DNCS 530 requires the set-top terminals to transmit the reverse analog signals, not in frequencies throughout the entire reverse bandwidth, such as from 5 MHz to 42 MHz, but rather, frequencies confined to a specific range that is condensed within the entire reverse bandwidth, such as from 16 MHz to 20 MHz. It will be appreciated that if a DNCS 530 is not used, each set-top can be initially programmed to transmit signals within that specific range. Advantageously, since the reverse analog bandwidth has been narrowed very drastically, the resulting reverse communications path 500 is a very efficient network that allows a convenient, cost-effective transition network. The transition network can be used to migrate towards a network that includes mainly all digital signals.

In accordance with the present invention, the A/D converter 535 digitizes the analog signals at a predetermined clock rate associated with a sampling clock 540. The clock rate can be, for example, an 8 MHz clock; however, it will be appreciated that the clock rate can be adjusted to fit the parameters of the reverse communications path 500. The resulting digital word that includes a predetermined number of bits, such as a 10 or 12-bit word, is then transmitted to the serializer 545 for delivery upstream. At the optical receiver 520, the deserializer 550 receives the serial stream and reconstructs the serial stream to reflect the originally sent framed digital word. A clock 560 is coupled to the D/A converter 555 that converts the digital signal back to an analog signal at the same clock rate as the clock 540 that is included within the optical transmitter 515. The analog signals are then provided to the headend 510 for further processing.

Those skilled in the art will be familiar with the Nyquist theory, which states an analog signal must be sampled at a frequency that is greater than twice the maximum signal bandwidth in order to ensure that all information can be extracted and the inherent aliasing will not corrupt the original signal. In the broadband communications system 100 discussed in FIG. 1, the A/D and D/A converters typically operate with a sampling clock of typically 100 MHz. 100 Mega samples per second (Ms/s), which is essentially equivalent to a 100 MHz sampling clock, is determined by understanding that the reverse bandwidth ranges from 5 MHz to 42 MHz and, therefore, has a maximum signal bandwidth of 37 MHz. Two times 37 results in a 74 Ms/s rate and then that is increased to 100 Ms/s for adequate sampling. Typically, manufacturers will offer converters with a higher sampling rate to accommodate additional reverse spectrums, such as from 5 MHz to 55 MHz and from 5 MHz to 65 MHz. If a 10-bit word is used as the size of the transmitted packet within the optical transmitter, the resulting bit rate throughout the reverse communications path is around 1 Giga bits per second (Gb/s). Also, the 1 Gb/s data stream is produced regardless of whether there is an RF signal present at the transmitter input or not.

The present invention, in contrast, utilizes the method of sub-sampling within the reverse bandwidth and has a resulting bit rate within the reverse communications path 500 of 40 Mb/s. This lower bit rate is due to limiting the number of reverse analog signals and confining their transmission to within a narrow 4 MHz bandwidth and sampling just that portion of the entire reverse bandwidth with a significantly lower sampling clock rate. More specifically, the DNCS 530 specifies the subscriber equipment 505a–n to transmit the reverse analog signals that are destined for the HFC network to be within the bandwidth range, for example, from 16 MHz to 20 MHz. As a result, the maximum signal bandwidth is 4 MHz. Per Nyquist, 2 times a bandwidth of 4 results in an 8 Mb/s rate. If a 10-bit word is used, the resulting bit rate is 80 Mb/s; however, since the transmission of reverse analog signals is confined to within a 4 MHz range and uses less channels when compared to the prior transmission of signals throughout the 37 MHz range, a significantly lower bit word may be transmitted while still providing adequate dynamic range. Consequently, a 5-bit word may be transmitted that produces a resulting bit rate of 40 Mb/s, thereby lowering the data rates throughout the system and allowing an operator a convenient method of transitioning between a conventional HFC network and a digital network.

An advantage of lowering the network's data rates is that the operators can use much less expensive communication equipment. For example, the A/D and D/A converters are not required to be as sophisticated and complex to process higher data rates. Digital equipment, such as a baseband digital optical transmitter and receiver, is no longer needed in the analog reverse path to digitize analog signals due to the digital signals and some of the allocated analog signals being sent over a digital network instead of previously being sent over the analog HFC network.

After the transmission of the sub-sampled reverse signals from the optical transmitter 515, the optical receiver 520 receives the signals. As a result of the sub-sampling and digitizing, however, the reverse signals have essentially been frequency-shifted within the reverse bandwidth. More specifically, what is received at the optical receiver 520 is a 4 MHz block of signals that is not within the transmitted 16 MHz to 20 MHz range as a consequence of the sub-sampling. What is recognized within the optical receiver 520, and ultimately the headend 510, are alias signals every 4 MHz, in the example using an 8 MHz clock. More specifically, there will be aliases from 0 MHz to 4 MHz and every 4 MHz thereon. The DNCS 530, however, is expecting the reverse signals to be within the range from 16 MHz to 20 MHz and, as a result, does not recognize the alias signals.

Figure 6:
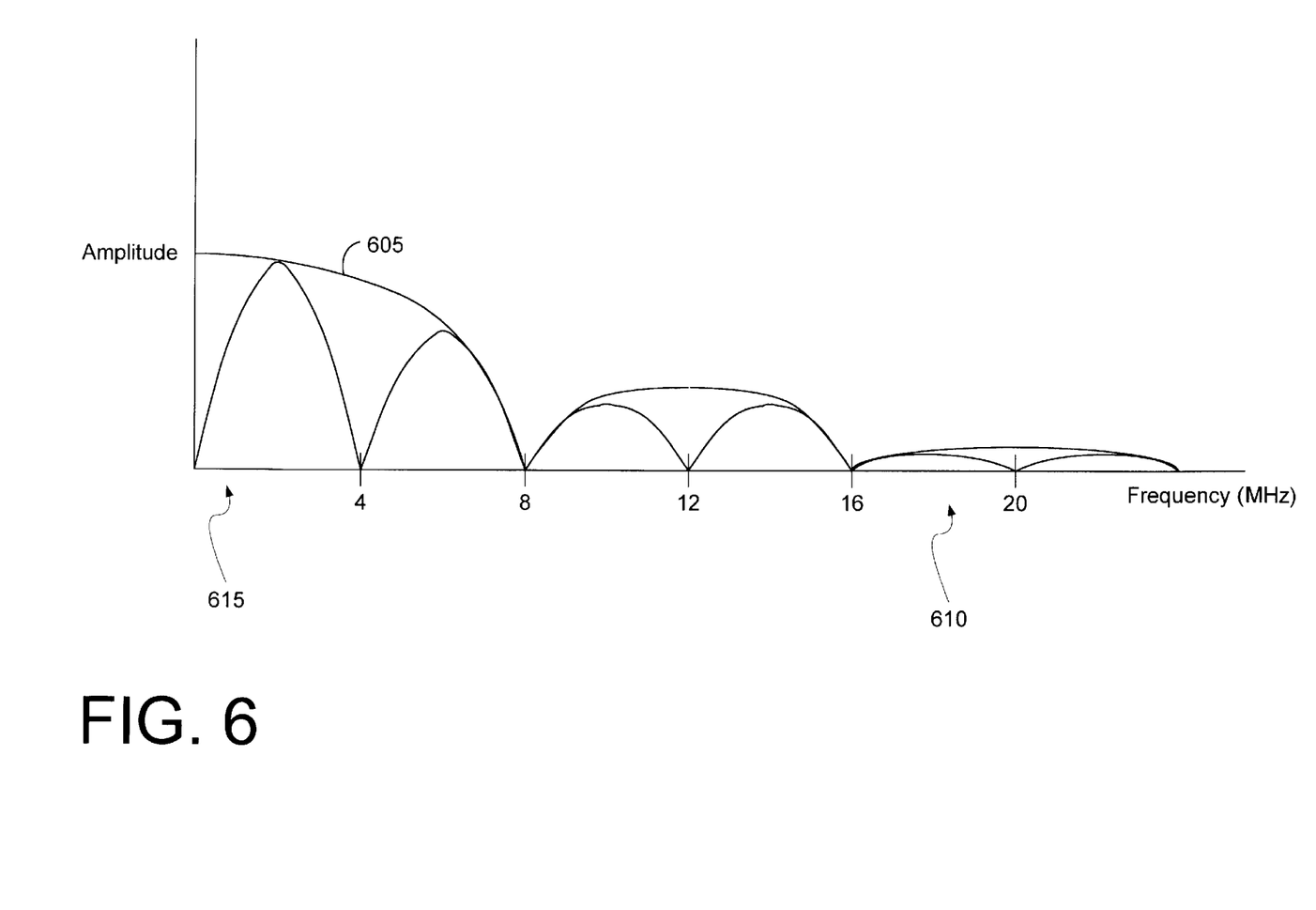
FIG. 6 illustrates a graph plotting aliases of a sub-sampled reverse signal and an amplitude limiting sin(x)/x using an 8 MHz clock cycle response from the output of the optical receiver.

As a consequence of the processing in the D/A converter 555, the output of the optical receiver 520 includes the reverse signals and aliases of the signals that are amplitude limited by a sin(x)/x response 605 as shown in FIG. 6. FIG. 6 illustrates a graph plotting the aliases using an 8 MHz clock cycle and an amplitude limiting sin(x)/x response from the output of the optical receiver 515. As a result, the amplitude of the signals within the range from 16 MHz to 20 MHz 610 is severely attenuated and the headend equipment is unable to recover any signal information. In contrast, the alias signal that possesses the most signal information is the signal from 0 MHz to 4 MHz; therefore, the reverse signals have been "frequency-shifted" to the range from 0 MHz to 4 MHz.

There are several methods of correcting for the "frequency-shift" of the reverse signals. One method may be to program the DNCS software to manipulate the signals to reflect the intended signals that were transmitted from the subscriber equipment 505a–n. Another method, which is in accordance with the present invention, is to implement a bit-stuffing circuit when the signals are received at the optical receiver 520 in order to correct the frequency-shift by using simple, convenient hardware and logic.

Figure 7:
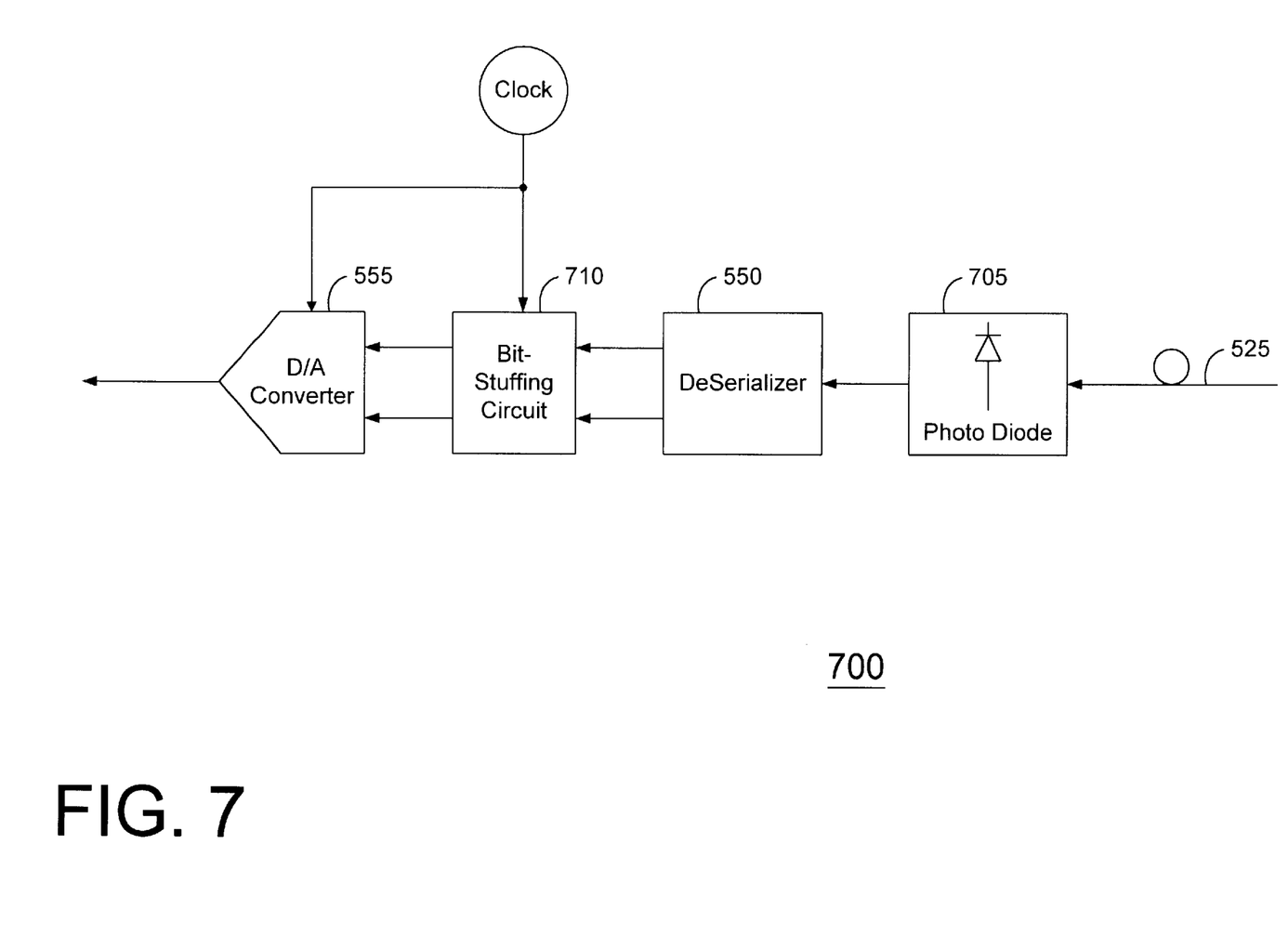
FIG. 7 is a block diagram illustrating an embodiment of an optical receiver including a bit-stuffing circuit for interleaving a predetermined number of words between the reverse signals in accordance with the present invention.

FIG. 7 illustrates an embodiment of an optical receiver 700 including a bit-stuffing circuit 710 for interleaving a predetermined number of words between the reverse signals to compensate for the frequency-shift. The optical signal is received at a photodiode 705 within the optical receiver 700 where the signals are converted back to electrical signals. The deserializer 550 deserializes the bit stream to reflect the framed digital word and then provides the digital word to a bit-stuffing circuit 710. The bit-stuffing circuit 710 in accordance with the present invention then interleaves words between the digital word and provides all these signals to the D/A converter 555 for conversion back to analog signals for further transmission upstream to the headend.

Figure 8:
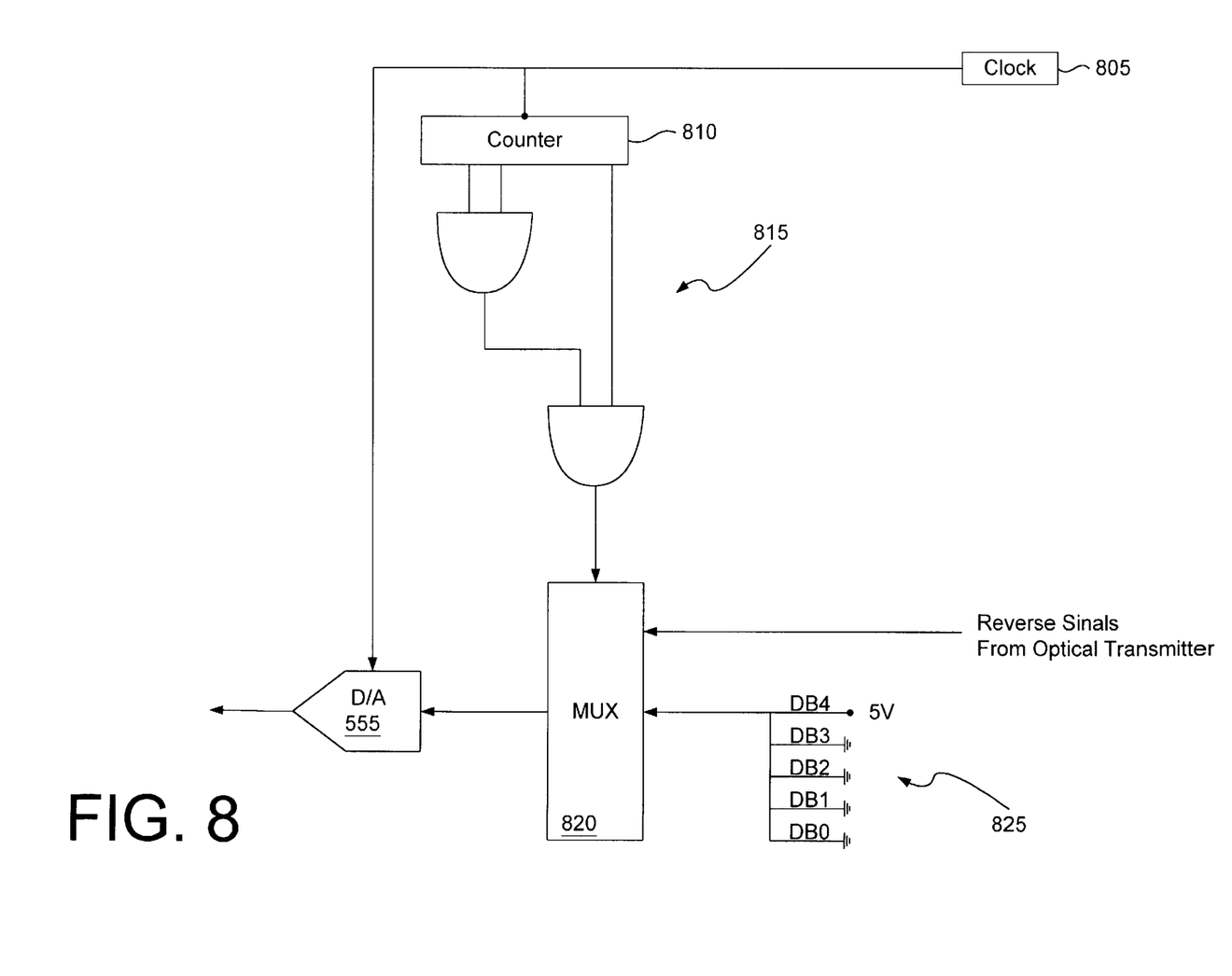
FIG. 8 is a block diagram of the bit-stuffing circuit that is suitable for use in the optical receiver of FIG. 7 in accordance with the present invention.
Figure 9:
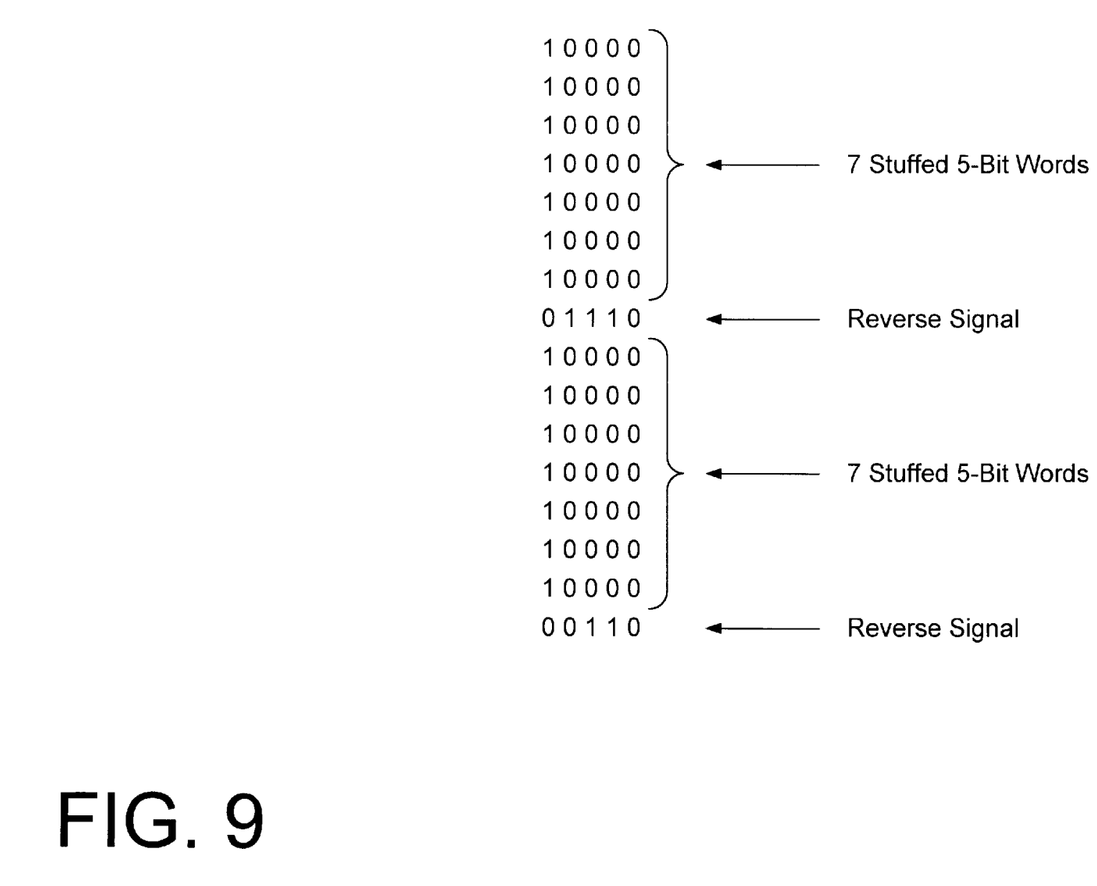
FIG. 9 is a table illustrating the interleaved words between the reverse data signals that are used in the bit-stuffing circuit of FIG. 8 in accordance with the present invention.

FIG. 8 illustrates the bit-stuffing circuit in further detail. A clock 805 is used to ultimately control the rate at which seven 5-bit words, which contain all zeroes except for the most significant bit (MSB), are interleaved between the reverse signal, which is also a 5-bit digital word. It will be appreciated that if a different number of bits were used in the transmitted words, such as a 10-bit word, then the bit-stuffing circuit would be changed to accommodate the different bits. In the preferred embodiment a 64 MHz clock is chosen to extract adequate signal information within the limited reverse bandwidth from 16 MHz to 20 MHz, and is described in further detail below. It will also be appreciated that if a different reverse range were used, such as from 38 MHz to 42 MHz, then a 128 MHz clock may be used to optimize the output. The clock 805 controls a counter 810 and logic gates 815. The counter 810 and gates 815 then control a multiplexer 820 to interleave seven 5-bit words 825 into the serial stream and then allow the reverse signal through the multiplexer 820 on the $8^{th}$ cycle. A table of the interleaved words, which are inserted via circuit 825, and exemplary reverse signals is shown in FIG. 9. The table shows the transmission of the seven 5-bit words and, on the $8^{th}$ cycle, the transmission of the reverse signal.

The interleaved words and the reverse signal are then provided to the D/A converter 555 (FIG. 8). The clock 805 is also tied into the D/A converter 555 to ensure that the D/A converter 555 is operating at the same clock rate as the multiplexer 820. The signals are then provided to the headend 510 (FIG. 5).

Figure 10:
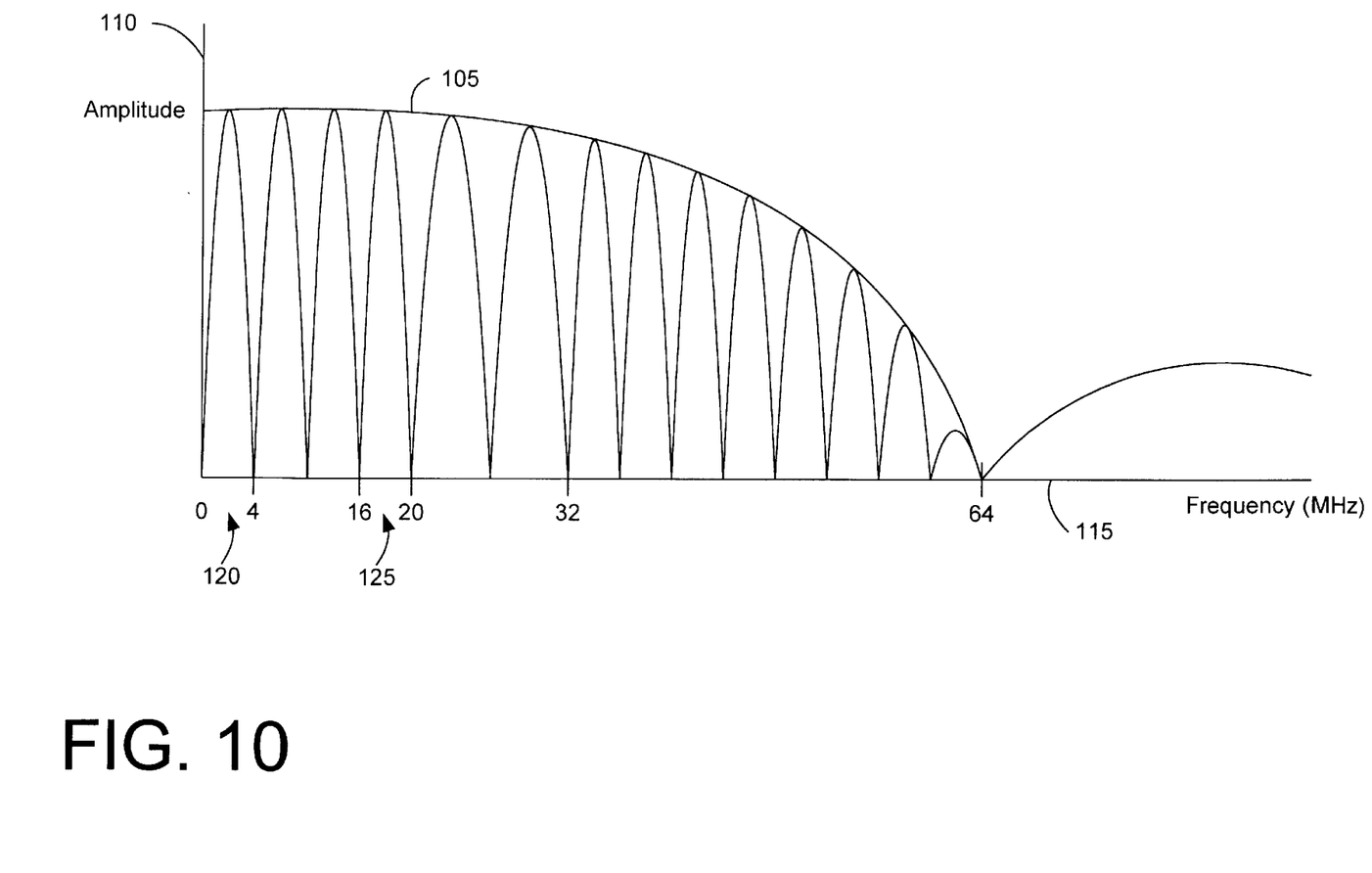
FIG. 10 is a graph plotting the output of the optical receiver of FIG. 7 that includes the bit-stuffing circuit in accordance with the present invention.

The output of the optical receiver 700 (FIG. 7) including the bit-stuffing circuit 710 is illustrated in the graph in FIG. 10. The output as shown plots the response's amplitude 110 versus the frequency 115 in MHz. The original "frequency-shifted" reverse signals 120 are shown from 0 MHz to 4 MHz and, due to the bit-stuffing circuit 710, the output response includes aliases that are amplitude limited by the sin(x)/x response 105 throughout the 64 MHz band. As mentioned above, the 64 MHz clock is chosen in this embodiment to allow the aliasing of the received signals represented throughout the 64 MHz band so that the amplitude of the alias that is in the range from 16 MHz to 20 MHz 125 is adequate despite the sin(x)/x response 105. More specifically, the delta in amplitude between the original reverse signals 120 and the aliased signals 125 is negligible; whereas, if a different reverse range is used, such as from 38 MHz to 42 MHz, then a different clock cycle should be used so that the delta in amplitude is not a factor. Since the DNCS 530 (FIG. 5) was originally programmed to recognize signals within the range from 16 MHz to 20 MHz, the alias signals of the frequency-shifted reverse signals are used to adequately process the received reverse signals. In this manner, the DNCS 530 ignores the received "frequency-shifted" signals and all other aliases and accommodates for the resulting frequency shift.

In the reverse communications path and method described hereinabove, limiting the reverse range for transmitting the reverse analog signals and sampling the digital reverse bandwidth within the A/D and D/A converters is an efficient, cost-effective network that allows for a transition towards using just a digital network.

What is claimed is:

1. In an HFC communications system, a method for transmitting signal information, comprising the steps of:

receiving a first analog signal in a predetermined portion of a frequency band, the analog signal having a first bandwidth;

digitizing the first analog signal to produce a digital signal by sampling at a frequency greater than twice the first bandwidth, the digital signal including data in the form of digital words;

transmitting the digital signal over an optical fiber;

receiving the digital signal;

interleaving a predetermined number of words between each word in the digital signal to create an interleaved digital signal; and converting the interleaved digital signal to a second analog signal, the analog signal including a plurality of aliases of the first analog signal, one of the plurality of aliases corresponding to the predetermined portion of the frequency band containing the first analog signal;

wherein the predetermined number of interleaved words is chosen such that the amplitude of the alias corresponding to the predetermined portion of the frequency band containing the first analog signal is sufficient to extract the signal information.

2. The method of claim 1, wherein the steps, subsequent to digitizing said first analog signal, further comprise:

serializing the first analog signal prior to transmission over the optical fiber.

3. The method of claim 2, wherein the steps, subsequent to receiving the digital signal, further comprise:

deserializing the digital signal.

4. In a communications system including a transmitter for transmitting a digital serial stream, a receiver for receiving the digital serial stream, the receiver comprising:

a deserializer for receiving the digital serial stream and converting the stream into a digital word;

an interleaver coupled to the deserializer for interleaving a predetermined number of words between each digital word to create an interleaved digital stream; and a converter coupled to the interleaver for converting the interleaved digital signal to an analog output signal, the analog output signal including a plurality of aliases of the digital serial stream, one of the plurality of aliases corresponding to the digital serial stream;

wherein the predetermined number of interleaved words is chosen such that the amplitude of the alias corresponding to the digital serial stream is sufficient to extract signal information included within the digital serial stream.

5. The receiver of claim 4, wherein the receiver is an optical receiver, and wherein the digital serial stream is an optical serial stream.

6. The receiver of claim 5, wherein the receiver further comprises:

a photodiode coupled between an input of the receiver and the deserializer for converting the optical serial streams to electrical serial streams.

7. The receiver of claim 4, wherein the interleaver further comprises:

a clock operating at the specified clock rate;

a counter responsive to the specified clock rate; and a multiplexer responsive to the counter, the multiplexer having a first port coupled to the deserializer for receiving the digital words and a second port coupled to circuitry for providing a specific number of bits included within each of the predetermined number of words.

8. The receiver of claim 7, wherein the circuitry provides the specific number of bits, wherein the most significant bit being equal to one and all additional bits equal to zero.

9. An HFC communications system for transmitting and receiving signals including information within a predetermined portion of a frequency band, the HFC communications system comprising:

subscriber equipment for generating and transmitting a first analog signal having a first bandwidth;

a transmitter coupled to the subscriber equipment for providing a digital serial stream by sampling at a frequency greater than twice the first bandwidth;

a receiver coupled to the transmitter, the receiver comprising:

a deserializer for converting the digital serial stream into a digital word;

an interleaver coupled to the deserializer for interleaving a predetermined number of words between each digital word at a specified clock rate to create an interleaved digital signal; and a converter for converting the interleaved digital signal to a second analog signal, the second analog signal including a plurality of aliases of the digital serial stream, one of the plurality of aliases corresponding to the predetermined portion of the frequency band containing the digital serial stream;

wherein the predetermined number of interleaved words is chosen such that the amplitude of the alias corresponding to the predetermined portion of the frequency band containing the digital serial stream is sufficient to extract the information included within the first analog signal.

10. The HFC communications system of claim 9, wherein the transmitter comprises:

an analog-to-digital converter for converting the first analog signal to a digital signal; and a serializer coupled to the analog-to-digital converter for converting the digital signal to a digital serial stream.

11. The HFC communications system of claim 9, wherein the transmitter is an optical transmitter and the transmitted digital serial stream is an optical stream, and wherein the receiver is an optical receiver.

12. The HFC communications system of claim 11, wherein the receiver further comprises:

a photodiode coupled between an input of the optical receiver and the deserializer for converting the optical stream to an electrical stream.

13. The HFC communications system of claim 9, wherein the interleaver further comprises:

a clock operating at the specified clock rate;

a counter responsive to the specified clock rate; and a multiplexer responsive to the counter, the multiplexer having a first port coupled to the deserializer for receiving the digital word and a second port coupled to circuitry for providing a specific number of bits included within each of the predetermined number of words.

14. The HFC communications system of claim 13, wherein the circuitry provides the specific number of bits, wherein the most significant bit equal to one and all additional bits of equal to zero.

* * * * *